United States Patent
Ladd et al.

(10) Patent No.: US 7,920,193 B2
(45) Date of Patent: Apr. 5, 2011

(54) METHODS, SYSTEMS AND APPARATUSES USING BARRIER SELF-CALIBRATION FOR HIGH DYNAMIC RANGE IMAGERS

(75) Inventors: John Ladd, Boise, ID (US); Gennadiy A. Agranov, Boise, ID (US); Dmitri Jerdev, South Pasadena, CA (US)

(73) Assignee: Aptina Imaging Corporation, George Town (KY)

( * ) Notice: Subject to any disclaimer, the term of this patent is extended or adjusted under 35 U.S.C. 154(b) by 656 days.

(21) Appl. No.: 11/976,301

(22) Filed: Oct. 23, 2007

(65) Prior Publication Data

US 2009/0101796 A1 Apr. 23, 2009

(51) Int. Cl.
*H04N 3/14* (2006.01)
(52) U.S. Cl. ........................................................ 348/308
(58) Field of Classification Search .................... 348/308
See application file for complete search history.

(56) References Cited

U.S. PATENT DOCUMENTS

| | | |
|---|---|---|
| 6,580,454 B1 | 6/2003 | Perner et al. |
| 6,680,498 B2 | 1/2004 | Guidash |
| 6,757,018 B1 | 6/2004 | Fowler |
| 6,788,340 B1 | 9/2004 | Chen et al. |
| 7,050,094 B2 | 5/2006 | Krymski |
| 7,119,317 B2 | 10/2006 | Ando et al. |
| 2002/0113886 A1 | 8/2002 | Hynecek |
| 2003/0058360 A1 | 3/2003 | Liu et al. |
| 2004/0036784 A1 | 2/2004 | Bock |
| 2004/0041077 A1 | 3/2004 | Fossum |
| 2004/0196398 A1 | 10/2004 | Doering et al. |
| 2005/0083421 A1* | 4/2005 | Berezin et al. ............... 348/308 |
| 2005/0168608 A1 | 8/2005 | Fossum |
| 2005/0212936 A1 | 9/2005 | Parks |
| 2006/0050163 A1 | 3/2006 | Wang et al. |
| 2006/0181625 A1 | 8/2006 | Han et al. |
| 2006/0284051 A1 | 12/2006 | Ko et al. |
| 2006/0284222 A1 | 12/2006 | Hong et al. |
| 2007/0018267 A1 | 1/2007 | Altice, Jr. et al. |
| 2007/0045681 A1 | 3/2007 | Mauritzson et al. |
| 2007/0103569 A1 | 5/2007 | Kawahito |
| 2007/0159546 A1* | 7/2007 | Takayanagi ............... 348/308 |
| 2009/0021627 A1* | 1/2009 | Fossum ..................... 348/308 |

FOREIGN PATENT DOCUMENTS

| | | |
|---|---|---|
| EP | 1 732 134 A1 | 12/2006 |
| EP | 1 924 085 A2 | 5/2008 |
| JP | 2002325202 | 11/2002 |
| JP | 2003259234 | 9/2003 |
| JP | 2004-282554 | 10/2004 |

(Continued)

OTHER PUBLICATIONS

Takayuki Hamamoto, et al., "A Computational Image Sensor with Adaptive Pixel-Based Integration Time," IEEE Journal of Solid-State Circuits, Apr. 2001, vol. 36, Issue 4, pp. 580-585.

(Continued)

*Primary Examiner* — James M Hannett

(57) ABSTRACT

Methods, systems and apparatuses proving a high dynamic range imager. Multiple photosensor integration periods are used to capture pixel signal information. A transistor gate is used to remove electrons from the photosensor between the two successive integration periods providing a non-linear pixel response characteristic having a knee point. Each pixel is calibrated for the knee point which is used during adjustment of the pixel output signal. Each pixel may also be calibrated with an arbitrary signal response curve for multiple light intensities.

25 Claims, 12 Drawing Sheets

FOREIGN PATENT DOCUMENTS

WO    WO 2004/064386 A1    7/2004

OTHER PUBLICATIONS

David Stoppa, et al., "Novel CMOS Image Sensor With a 132-dB Dynamic Range," IEEE Journal of Solid-State Circuits, Dec. 2002, vol. 37, Issue 12, pp. 1846-1852.

Sungsik Lee, et al., "High Dynamic-Range CMOS Image Sensor Cell Based on Self-Adaptive Photosensing Operation," IEEE Journal on Electron Devices, Jul. 2006, vol. 53, No. 7, pp. 1733-1735.

Lisa G. McIlrath, "A Low-Power Low-Noise Ultrawide-Dynamic-Range CMOS Imager with Pixel-Parallel A/D Conversion," IEEE Journal of Solid-State Circuits, May 2001, vol. 36, Issue 5, pp. 846-853.

* cited by examiner

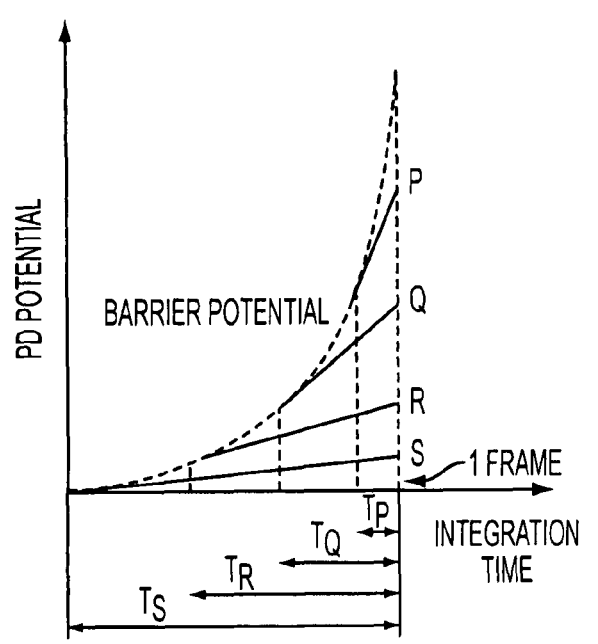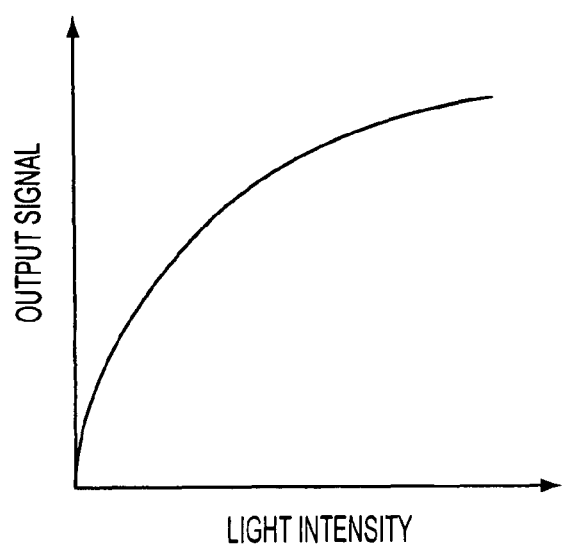
FIG. 10A
FIG. 10B

METHODS, SYSTEMS AND APPARATUSES USING BARRIER SELF-CALIBRATION FOR HIGH DYNAMIC RANGE IMAGERS

FIELD OF THE INVENTION

The embodiments described herein relate generally to imagers, and more particularly to high dynamic range imagers.

BACKGROUND

A CMOS imager circuit includes a focal plane array of pixels, each of the pixels including a photosensor, for example, a photogate, photoconductor or a photodiode overlying a substrate for accumulating photo-generated charge in the underlying portion of the substrate. Each pixel has a readout circuit that includes at least an output field effect transistor and a charge storage region formed on the substrate connected to the gate of an output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel perform the necessary functions of: (1) photon to charge conversion; (2) accumulation of image charge; (3) resetting the storage region to a known state; (4) transfer of charge to the storage region; (5) selection of a pixel for readout; and (6) output and amplification of a signal representing pixel charge. The charge at the storage region is typically converted to a pixel output voltage by a source follower output transistor.

FIG. 1 illustrates a conventional CMOS imager 100 having a pixel array 102 connected to column sample and hold (S/H) circuitry 136. The pixel array 102 comprises a plurality of pixels 110 arranged in a predetermined number of rows and columns. The illustrated pixel 110 shown is a four transistor pixel. Other pixel designs are also well know and could be used in array 102. The pixel 110 contains a pinned photodiode photosensor 112, transfer gate 114, a floating diffusion region FD to collect charge transferred from the photosensor 112, a reset transistor 116, row select transistor 120 and a source follower output transistor 118.

The reset transistor 116 is connected between the floating diffusion region FD and an array pixel supply voltage Vaa-pix. A reset control signal RST is used to activate the reset transistor 116, which resets the floating diffusion region FD to the array pixel supply voltage Vaa-pix level, as is known in the art. The source follower transistor 118 has its gate connected to the floating diffusion region FD and is connected between the array pixel supply voltage Vaa-pix and the row select transistor 120. The source follower transistor 118 converts the charge stored at the floating diffusion region FD into an electrical output voltage signal Vout. The row select transistor 120 is controllable by a row select signal SEL for selectively connecting the source follower transistor 118 and its output voltage signal Vout to a column line 122 of the pixel array 102.

In operation, the pixels 110 of each row in the array 102 are all turned on at the same time by a row select line and the pixels 110 of each column are selectively output onto a column line 122. A plurality of row and column lines are provided for the entire array 102. The row select lines which control pixel transistors within a row are selectively activated by row decoder 130 and driver circuitry 132 in response to an applied row address. Column select lines are selectively activated in response to an applied column address by column circuitry that includes column decoder 134. Thus, row and column addresses are provided for each pixel 110. The CMOS imager 100 is operated by an imager control and image processing circuit 150, which controls the row and column circuitry for selecting the appropriate row and column lines for pixel readout.

Each column is connected to sampling capacitors and switches in the S/H circuitry 136. A pixel reset signal Vrst and a pixel image signal Vsig for selected pixels are sampled and held by the S/H circuitry 136. A differential signal (e.g., Vrst−Vsig) is produced for each readout pixel by the differential amplifier 138 (AMP), which applies a gain to the signal received from the S/H circuitry 136. The differential signal is digitized by an analog-to-digital converter 140 (ADC). The analog-to-digital converter 140 supplies the digitized pixel signals to the imager control and image processing circuit 150, which among other things, forms a digital image output. The imager also contains biasing/voltage reference circuitry 144.

Ideally, digital images created through the use of CMOS and other solid state imagers are exact duplications of the imaged scene projected upon the imager arrays. However, pixel saturation, analog-to-digital conversion saturation, exposure, and gain setting limitations and bit width processing limitations in an imager can limit the dynamic range of a digital image of the scene.

Each of the pixels 110 of pixel array 102 has a characteristic dynamic range. Dynamic range refers to the range of incident light that can be accommodated by a pixel in a single image frame. It is desirable to have pixels with a high dynamic range to image scenes that generate high dynamic range incident signals, such as indoor rooms with windows to the outside, outdoor scenes with mixed shadows and bright sunshine, and night-time scenes combining artificial lighting and shadows.

The dynamic range for a pixel is commonly defined as the ratio of its largest non-saturating signal to the standard deviation of its noise under dark conditions. The dynamic range is limited on an upper end by the charge saturation level of the pixel photosensor and on a lower end by noise imposed limitations and/or quantization limits of the analog-to-digital converter used to produce a digital signal from analog pixel signals. When the dynamic range of a pixel is too small to accommodate the variations in light intensities of the imaged scene, e.g. by having a low saturation level, image distortion occurs.

There are many techniques designed to achieve high dynamic range image outputs from a pixel. Some approaches which have been employed include signal companding, multiple image signal storage, and image signal controlled reset. Companding involves compressing and subsequently expanding a signal to increase the dynamic range, but suffers from drawbacks such as requiring a non-linear pixel output that hampers subsequent processing and causes increased pixel fixed pattern noise (FPN), a dip in the signal to noise ratio (SNR) at the knee point, and low contrast at high brightness. Structures providing multiple signal storage and signal controlled reset may not be practical because they require an increase in die area due to required additional column circuitry.

Another approach to increase dynamic range is to use multiple image captures with different integration times. Dual image capture with a pixel array, for example, is relatively simple to implement, but suffers from an signal-to-noise-ratio dip at the knee point of the collected charge relative to the output signal. A multiple image capture approach that requires more than two image captures is difficult to implement and requires high speed, non-destructive, readout along with on-chip memory and additional column circuitry.

Other approaches to increasing dynamic range rely on pixels that have a variable response to adapt to higher illumination levels (e.g., linear response at lower illumination levels and, for example, logarithmic response at higher illumination). Some techniques rely on variable bias conditions to remove a percentage of any accumulated charge at higher illumination levels. Yet other techniques use variable exposure times. Pixels that use variable response circuit techniques like logarithmic pixels or that use variable bias conditions to spill off excess charge typically suffer from pixel-to-pixel response variation. This variation occurs due to the difficulty in achieving high precision transistor device matching in the pixels throughout a pixel array. Methods that use variable exposure time must tradeoff spatial resolution for rows of pixels with different exposure times. This tradeoff is undesirable. In addition, there are other techniques that add multiple transistors to the pixel circuits. The use of additional transistors in a pixel for improving dynamic range lowers the photosensor "fill factor" and does not allow for small-sized pixels.

Another technique suggested for pixel high dynamic range operation includes providing multiple integration times by using a barrier overflow technique, which means that electrons are caused to overflow a barrier threshold of a transistor coupled to the pixel photosensor, thereby allowing more charge to accumulate in the photosensor. Currently known barrier overflow techniques used to achieve multiple integration times for high dynamic range operation, however, have disadvantages, including variations in the barrier threshold from pixel to pixel due to fabrication process differences for pixel transistors in an array, making it difficult to build a high dynamic range imager with high performance, especially for color imaging. Variations in the barrier thresholds from pixel to pixel cause errors in a pixel signal linearization process which assumes the same barrier threshold for all pixels of an array.

Accordingly, there exists a need for a technique for achieving multiple integration times to achieve a high dynamic range operation, while mitigating problems with transistor fabrication differences from pixel to pixel. It is further desirable to provide a high performance color imager for high dynamic range applications.

BRIEF DESCRIPTION OF THE DRAWINGS

FIG. 10A illustrates the barrier potential and photosensor potential during the integration period, for various light intensities, in accordance with a disclosed embodiment.

FIG. 10B illustrates the resulting signal response curve of FIG. 10A, in accordance with disclosed embodiments.

DETAILED DESCRIPTION

In the following detailed description, reference is made to the accompanying drawings, which are a part of the specification, and in which is shown by way of illustration various embodiments and how they may be practiced. These embodiments are described in sufficient detail to enable those skilled in the art to make and use them. It is to be understood that other embodiments may be utilized, and that structural, logical, and electrical changes, as well as changes in the materials used, may be made to each of the disclosed embodiments without departing from the spirit and scope of the invention.

The term "pixel" refers to a photo-element unit cell containing a photosensor and transistors for processing an electrical signal from electromagnetic radiation sensed by the photosensor. Although the embodiments are described herein with reference to the architecture and fabrication of one pixel, it should be understood that this is representative of a plurality of pixels in an array of an imager. In addition, although the embodiments may be described below with reference to a CMOS imager, they may have applicability to other solid state imagers having pixels. The following detailed description is, therefore, not to be taken in a limiting sense.

Disclosed embodiments provide an imager with high dynamic range imaging by performing multiple integrations with the photosensor of each pixel. This is done by using a transistor coupled to the photosensor which is operated to lower a potential barrier level and to "spill" excess charge from the photosensor between two or more successive integration periods. In disclosed embodiments, variations in the transistor gate threshold voltage (Vt) caused by fabrication processes, temperature conditions or other influencing factors create differences in the potential barrier level even though the same barrier lowering gate voltage is applied to all barrier lowering transistors within a pixel array. This causes some ambiguity in the location of a knee point in a pixel output response characteristics which can lead to erroneous correction of pixel values at and around the knee point. Therefore, a pixel-wise knee point correction is employed. As a result of the implementation of disclosed embodiments, a high dynamic range image with low fixed pattern noise can be achieved. The disclosed embodiments work for rolling shutter and global shutter readout operations of a pixel array.

Figure 1:
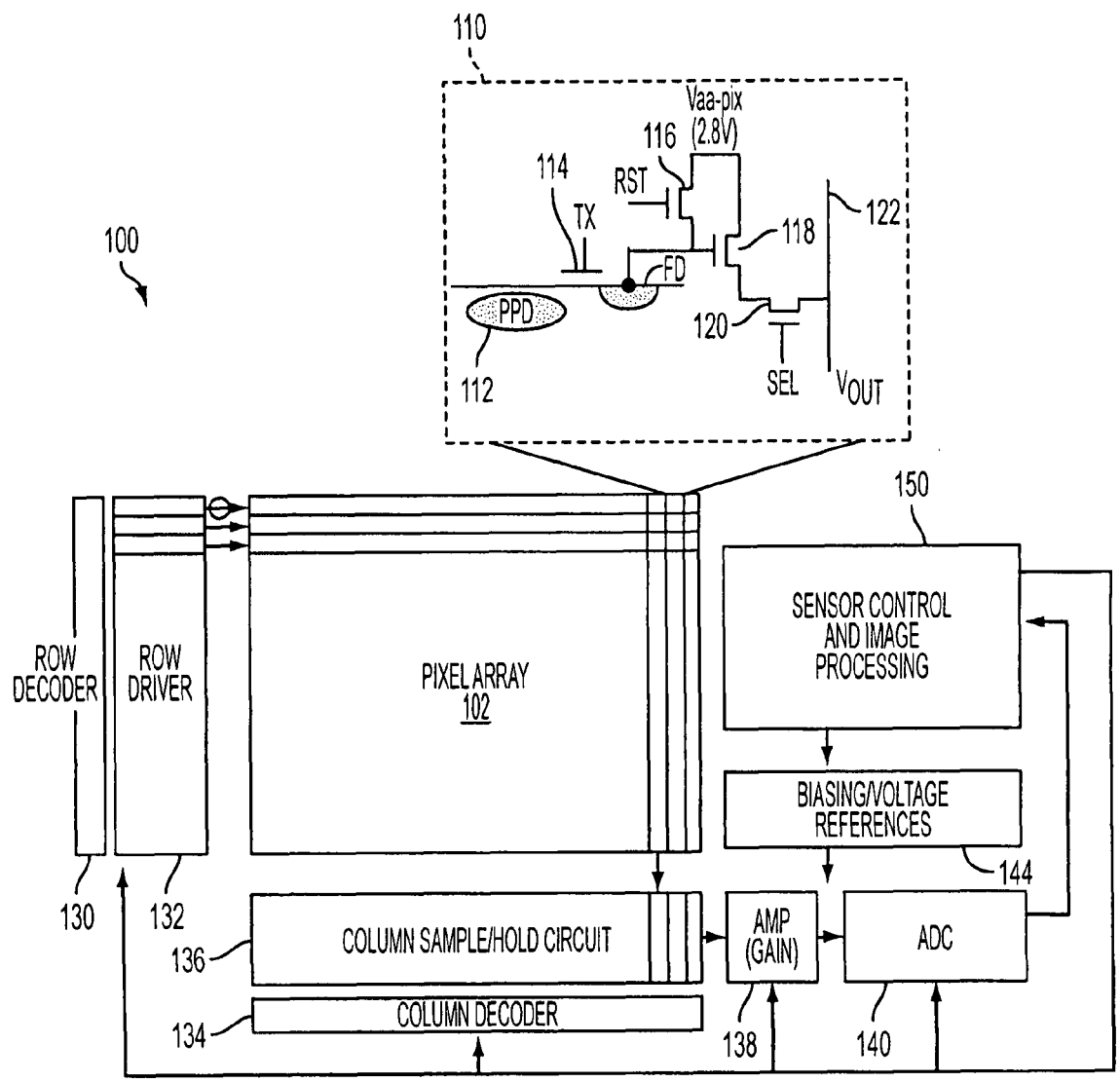
FIG. 1 illustrates a conventional CMOS imager, employing one example of a four transistor pixel circuit.
Figure 2A:
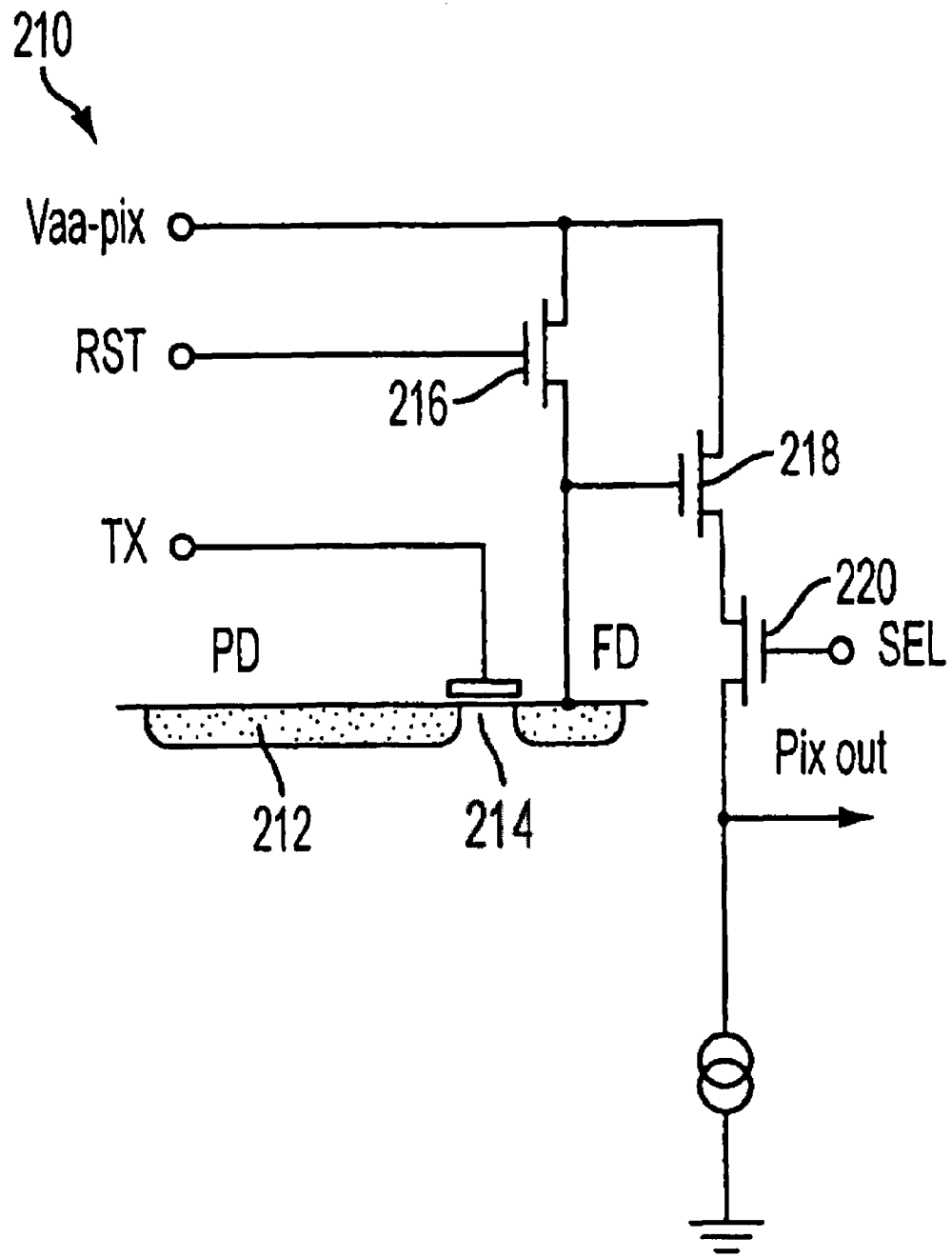
FIG. 2A illustrates a pixel structure in accordance with disclosed embodiments.

FIG. 2A illustrates a four transistor pixel circuit, with reference to which disclosed embodiments will be described. Pixel circuit 210 includes a photosensor 212, transfer gate 214, a floating diffusion region FD to collect charge transferred from the photosensor 212, a reset transistor 216, a source follower output transistor 218, and a row select transistor 220. The reset transistor 216 is connected between the floating diffusion region FD and an array pixel supply voltage Vaa-pix. A reset control signal RST is used to activate the reset transistor 216, which resets the floating diffusion region FD to the array pixel supply voltage Vaa-pix level. The source follower transistor 218 has its gate connected to the floating diffusion region FD and is connected between the array pixel supply voltage Vaa-pix and row select transistor 220. The source follower transistor 218 converts the charge stored at the floating diffusion region FD into an electrical output voltage signal. The imager control and image processing circuit 150 (FIG. 1), controls the row and column circuitry for selecting the appropriate row and column lines for pixel readout as well as the operation of the various transistors of the pixel 210.

Figure 2B:
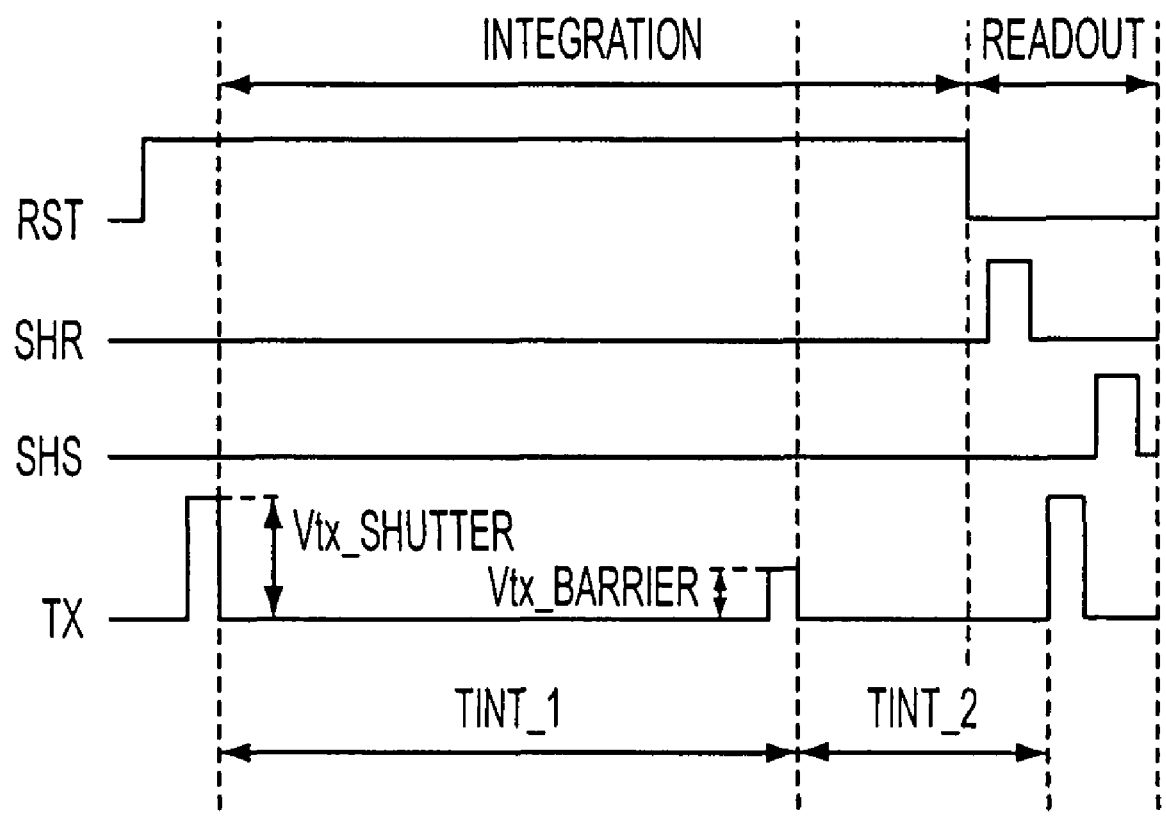
FIG. 2B illustrates a timing diagram for a high dynamic range operation with dual exposure in accordance with disclosed embodiments.
Figure 3A:
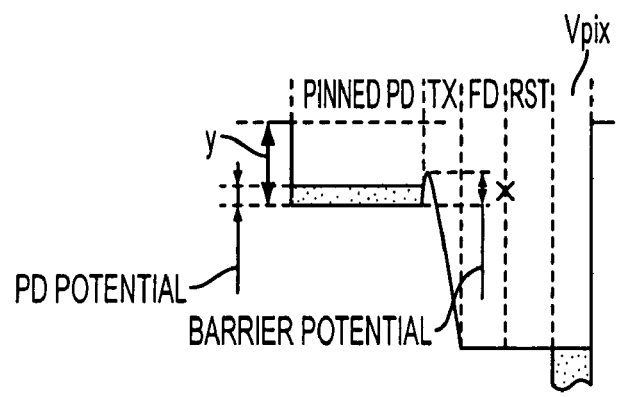
FIG. 3A illustrates a potential diagram showing the accumulation of charge on a photodiode pixel with low illumination before the break point, in accordance with disclosed embodiments.
Figure 3B:
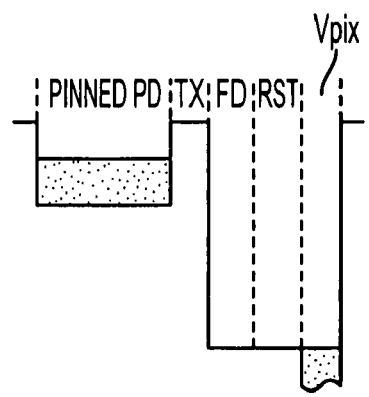
FIG. 3B illustrates a potential diagram showing the accumulation of charge on a photodiode pixel with low illumination at the end of the integration period, in accordance with disclosed embodiments.
Figure 3C:
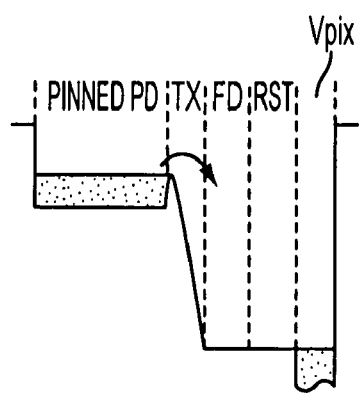
FIG. 3C illustrates a potential diagram showing the accumulation of charge on a photodiode pixel with high illumination before the break point, in accordance with disclosed embodiments.
Figure 3D:
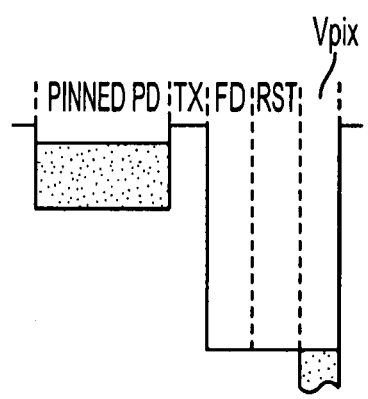
FIG. 3D illustrates a potential diagram showing the accumulation of charge on a photodiode pixel with high illumination at the end of the integration period, in accordance with disclosed embodiments.

Referring to FIGS. 2A, 2B and 3, during an image capture operation of a pixel 210, the photosensor 212 is reset at the beginning of an image capture integration period by pulsing the transfer gate 214 with a high TX signal which exceeds the threshold voltage (Vt) of transistor 214 (e.g., at 3.2 volts) and setting the RST signal high which provides an electron flow path between the photosensor 212 and the Vaa-pix potential source. This completely empties the photosensor 212 of electrons. When the TX potential returns to low, a first charge integration period Tint_1 begins. The TX potential is kept low for throughout Tint_1 (FIG. 2B) which is a first period of image integration by photosensor 212. Photosensors 212 that are exposed to high illumination during the first integration period will quickly go to saturation. Photosensors 212 that are exposed to low illumination will continue to acquire photogenerated charge throughout the entirety of the first integration period. At the end of the first integration period (Tint_1), the transfer gate 214 TX gate potential is set to some intermediate voltage, lowering barrier potential (Vtx_BARRIER) (FIG. 2B) and allowing an overflow of electrons within the photosensor 212 to the floating diffusion region FD for photosensors 212 under high illumination (FIG. 3C). Since the reset signal RST remains on throughout the integration period, the overflow electrons move from the floating diffusion region FD into the source voltage Vaa-pix. This overflow of electrons sets the initial conditions for starting a second integration period (Tint_2) which allows continuous collection of a charge from photosensors 212 under high illumination because the photosensor 212 will not reach saturation levels (due to the electron overflow and draining operation). At the time that the TX potential is pulsed to a level of Vtx_BARRIER, the acquired charge for photosensors 212 under low illumination remains less than the barrier potential. Therefore, for those photosensors 212, no electron overflow occurs across the transfer transistor 214 and they continue charge accumulation during Tint_2 (FIG. 3A). As a result of the intermediate pulse (Vtx_BARRIER) of the transfer gate 214, a dual exposure mode of operation is achieved. The integration period for photosensors 212 under low illumination is equal to the total integration period (Tint_1+Tint_2) and the integration period for photosensors 212 under high illumination is equal to the second integration period (Tint_2).

During a pixel read out operation, each pixel provides a Vrst signal, provided by source follower transistor 218, which is sampled and held when the floating diffusion region FD is under a reset charge produced by a RST pulse applied to the gate of the reset transistor 216 while Vaa-pix is at the operating voltage level. In addition, the photosensor 212 accumulated charge signal at the end of the second integration period Tint_2 is provided as a pixel output signal Vsig by the source follower transistor 218 which is sampled and held. These signals Vrst and Vsig are subtracted and amplified (see 138, FIG. 1) and digitized by ADC 140 and supplied to an image processing circuit 150.

Figure 4A:
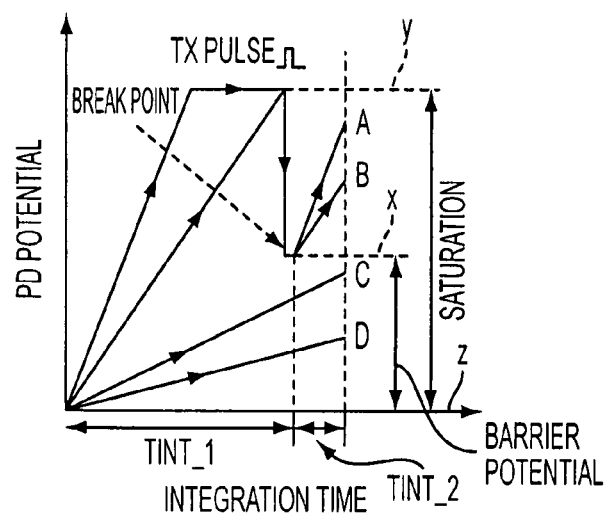
FIG. 4A illustrates TX barrier potential and photosensor potential during the integration period, for various light intensities, in accordance with disclosed embodiments.

FIG. 4A illustrates the photosensor, e.g. pinned photodiode, potential of four different pixel output signals (Vrst–Vsig) as a function of integration time during operation of disclosed embodiments. Each of lines A, B, C and D shows how charge in the photosensor 212 changes with the exposure, depending on light intensity. The barrier potential X and photosensor saturation potential Y are measured from the pinned potential Z of the photosensor 212, as illustrated in FIG. 3. Curves C and D show the photosensor 212 response for two pixels in the case of low light intensities. The photosensor 212 charge in the case of low light intensities follows the trend that it would normally follow for a photosensor 212 operating in normal, linear integration mode (without the dual exposure). Curves A and B show the photosensor 212 response for two pixels in the case of high light intensity. The photosensor 212 charge in the case of high light intensities reaches a saturation level Y and at the time of the Vtx_BARRIER pulse, drops to the barrier potential level X. That is, the residual charges remaining in the photosensor 212 correspond to barrier potential level X. The integration time for pixels A and B is equal to Tint_2 and the integration of additional charge begins with the residual charge remaining in the photosensor 212 after the barrier potential is lowered to a value X. The resulting signal response as a function of light intensity is shown on FIGS. 4A and 4B.

Figure 4B:
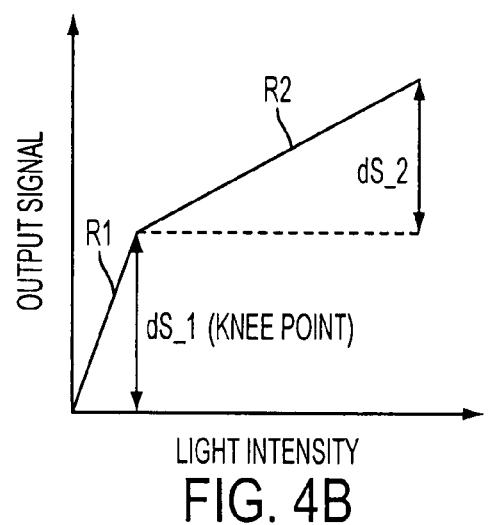
FIG. 4B illustrates the resulting two knees signal response curve of FIG. 4A in accordance with disclosed embodiments.

In FIG. 4B, it is important to note that the exact value of dS_1 the knee point, which is the pixel signal level corresponding to the residual charges in the photosensor 212, is unknown and varies depending upon the fabrication process, and operating conditions, such as temperature, voltage and others. It also can vary from pixel to pixel and depends on the threshold voltage (Vt) characteristics of the transfer transistor 214. Without knowing the exact value of dS_1, the pixel response cannot be correctly linearized and color processing cannot be correctly performed. Accordingly, in accordance with embodiments disclosed here, a calibrated value of the knee point CALIB may be determined. This is done by using a pixel-by-pixel knee point calibration technique.

Referring to FIGS. 2, 6, 7A, 7B and 7C, a pixel-by-pixel knee point calibration technique is now described. In order to perform the calibration of a pixel 210, first, the photosensor 212 is reset by pulsing the transfer gate 214 with a high TX signal and setting the RST signal high which provides an electron flow path between the photosensor 212 and the Vaa-pix potential source. This completely empties the photosensor 212 of electrons. Then, a "fill" operation occurs, where the Vaa-pix potential on the source follower transistor 218 is lowered, e.g., to ground, while a high voltage is applied on the transfer 214 and reset 216 gates via signals TX and RST, respectively. As a result, the photosensor 212 is filled with electrons (see FIG. 7A). Vaa-pix then returns to its supply voltage level. Thereafter, a Vtx_BARRIER pulse is applied to transfer gate 214 and excess electrons are "spilled" to the floating diffusion region FD and drained to the supply voltage Vaa-pix. Since the reset transistor 216 is still active, the floating diffusion region is still in a "reset" state and spilled charges are passed to the supply voltage Vaa-pix source. After this, a standard pixel readout sequence occurs, in which the floating diffusion region FD which is under "reset" conditions is sampled by generating a SHR signal to produce a Vrst signal, charge is transferred from the photosensor 212 by generating a TX signal, and the image signal Vsig is sampled by generating a SHS signal (see FIG. 7C). Regardless of illumination level (assuming the time between SHR and SHS is small enough), the charge remains in the photosensor 212 after a "fill-and-spill" calibration operation (FIGS. 7A, 7B and 7C) corresponds to the barrier potential X (FIG. 4A) for that pixel. This barrier potential X represents the location of the knee point of a pixel response curve (FIG. 4B).

In this manner, the previously unknown knee point of FIG. 4B is able to be calibrated for each pixel by taking a Vsig output from the pixel representing the residual charges in photosensor 212 after the "fill-and-spill" operation. The values of the knee point can be used during image pixel signal processing to more accurately linearize the digitized pixel signal (as discussed in more detail below). The self-calibration technique eliminates the uncertainty of the location of knee points from pixel to pixel due to variations of transfer gate threshold voltage and pinned potential, and the resulting fixed pattern noise associated with this uncertainty. The calibrated values (CALIB) corresponding to the locations of the knee points (dS_1) for each pixel are determined and stored in an imager and are used by an image processing circuit, e.g., 150 (FIG. 1) to correctly linearize a pixel response for a captured image.

During imager use, once an image has been captured, linearization of pixel signal response is performed. To perform linearization of signal response, the intensity of light striking the photosensor must be calculated for each pixel. In order to provide a more accurate linearization, this calculation may be based upon the known values of Tint_1, Tint_2 and the calibrated value (CALIB). In previously used methods, the value of dS_1 was not precisely known, and therefore a value was assumed for purposes of linearization. Disclosed embodiments, however, are able to use the value of CALIB to determine the value of dS_1 for each pixel, therefore allowing a more accurate linearization process.

In a linearization procedure, first, the pixel signal value at which the knee point occurs (KNEEPOINT) must be calculated. This may be done in accordance with Equation (1):

$$\text{KNEEPOINT} = \text{CALIB} * (\text{Tint\_1} + \text{Tint\_2}) / (\text{Tint\_1}) \quad (1)$$

It is important to note that the pixel signal value of the knee point (KNEEPOINT) is not equal to CALIB, because residual charge after the barrier voltage (Vtx_BARRIER) is applied remains in photosensor 212 during additional charge accumulation over the period Tint_2.

The intensity of the light striking each photosensor (INTENSITY) may then be calculated in accordance with one of Equations (2) and (3):

$$\text{INTENSITY} = \text{PIXEL\_SIGNAL} / (\text{Tint\_1} + \text{Tint\_2}) \quad (2)$$

$$\text{INTENSITY} = (\text{PIXEL\_SIGNAL} - \text{KNEEPOINT}) / (\text{Tint\_2}) \quad (3)$$

Where INTENSITY is the intensity of light striking the pixel, KNEEPOINT is the signal value at which the knee point occurs and PIXEL_SIGNAL is the image output signal from the pixel (Vrst−Vsig). Equation (2) is used in cases of low illumination (dim light), when the value of the pixel signal (PIXEL_SIGNAL) is less than the value of KNEEPOINT. Equation (2) is also used in the case where the value of the pixel signal (PIXEL_SIGNAL) is equal to the value of KNEEPOINT. Equation (3) is used in cases of high illumination (bright light), when the value of the pixel signal (PIXEL_SIGNAL) is greater than that value of KNEEPOINT. Thus, the KNEEPOINT value is used to determine whether a particular pixel is subject to low levels of illumination or to high levels of illumination.

Figure 5:
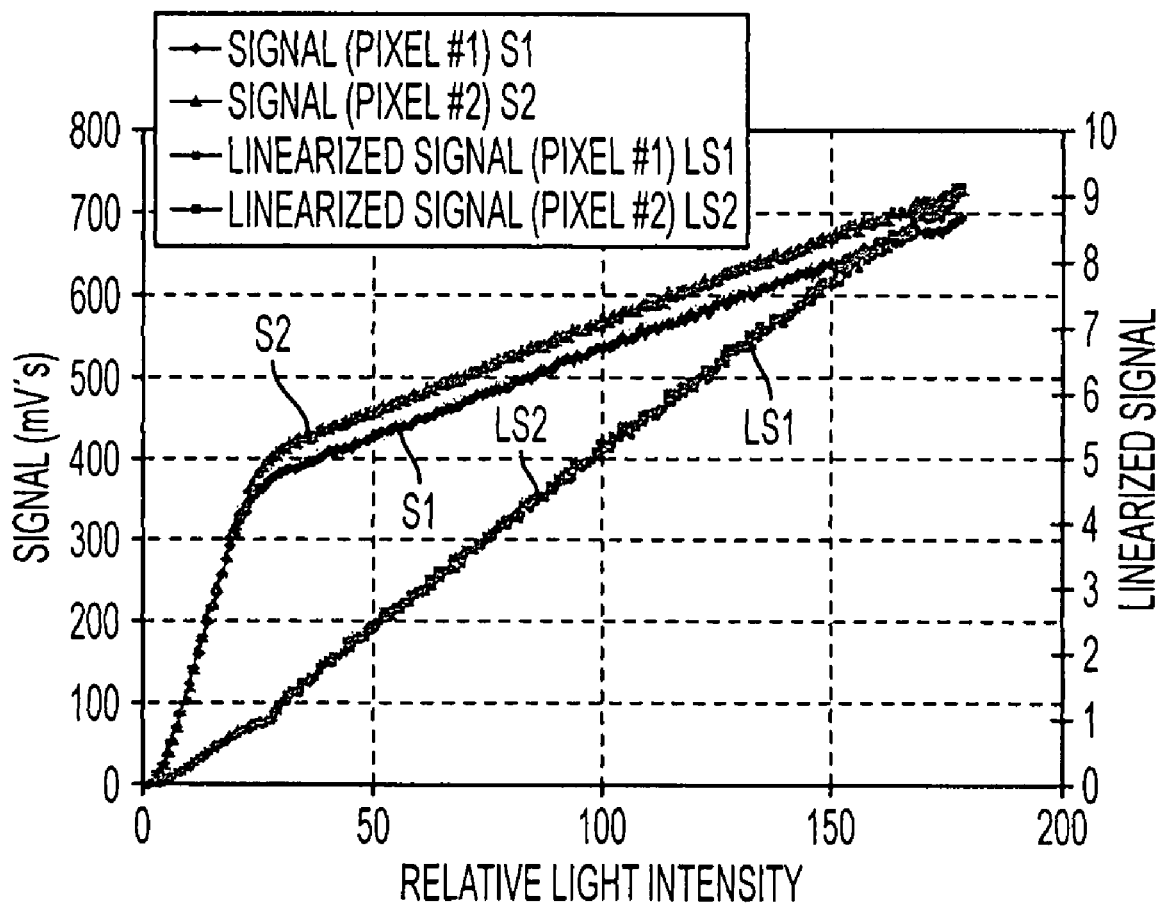
FIG. 5 illustrates experimental results of a pixel comparison using disclosed embodiments.

Once the INTENSITY values have been determined for each pixel, the intensity response no will be a linear function to exposure. Further linearization procedures can be used to remove second order non-linear effects. Linearization may proceed in accordance with known linearization techniques. During linearization, scaling factors are applied to an acquired pixel signal, depending on whether a pixel signal is above or below the calibrated knee point. The scaling factors are chosen to produce a linear response for the pixel output over a wide dynamic range. As one example, the scaling factors may be stored as a look-up table relating input pixel signal values to linearized pixel signal values. FIG. 5 illustrates the results of the linearization calculation from Equations (2) and (3) for two separate pixels within a pixel array from image signal data captured using a test chip. The data was captured using the embodiments described with individual pixel calibration of the response knee point. An image was taken and, for two separate pixels within the array, linearization was performed. Before linearization, each pixel has a different Vtx_BARRIER threshold of the transfer transistor and a different resulting knee point (see FIG. 5, lines S1, S2). But after linearization, using the calibrated knee points both pixels have almost exactly the same linearized signal (see FIG. 5, lines LS1, LS2).

It should be understood that disclosed embodiments may be implemented using either an imager implementing a rolling shutter mode of operation or an imager using a global shutter. In rolling shutter operation, the first row begins exposure first and then the next rows sequentially follow. The integration period is the same for each row. On the other hand, for an imager with a global shutter, the start of the integration period begins at the same time for all pixels in the imager.

Figure 6:
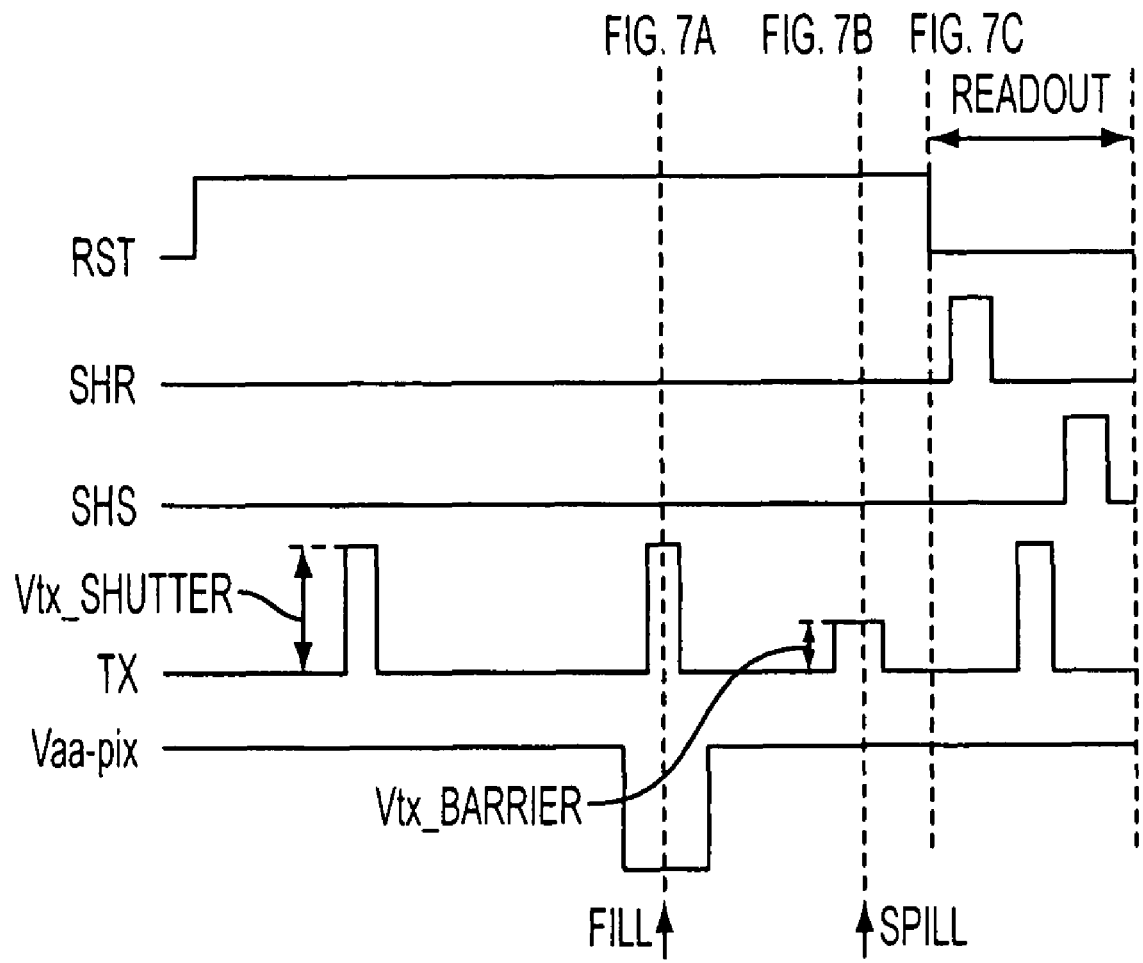
FIG. 6 illustrates a timing diagram for a barrier calibration conducted in accordance with disclosed embodiments.
Figure 7:
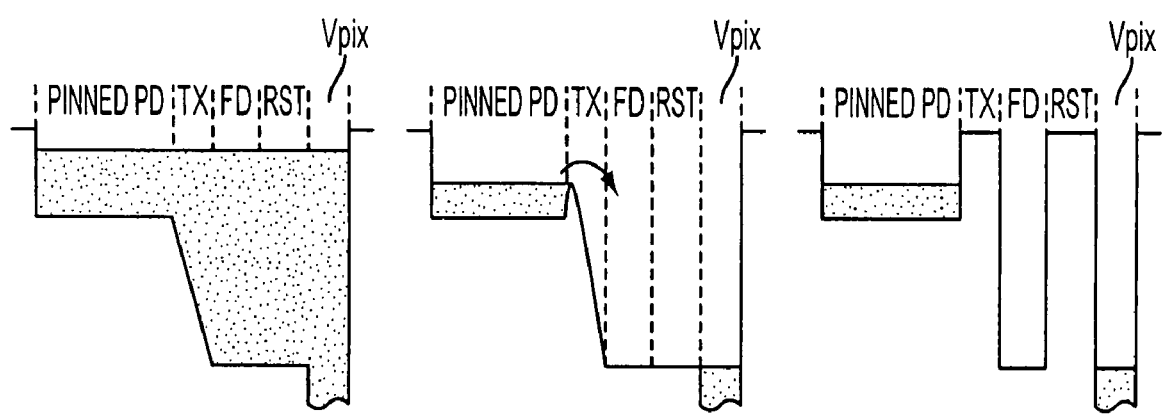
FIGS. 7A, 7B and 7C illustrate potential diagrams for a fill-and-spill operation, in accordance with disclosed embodiments.
Figure 8:
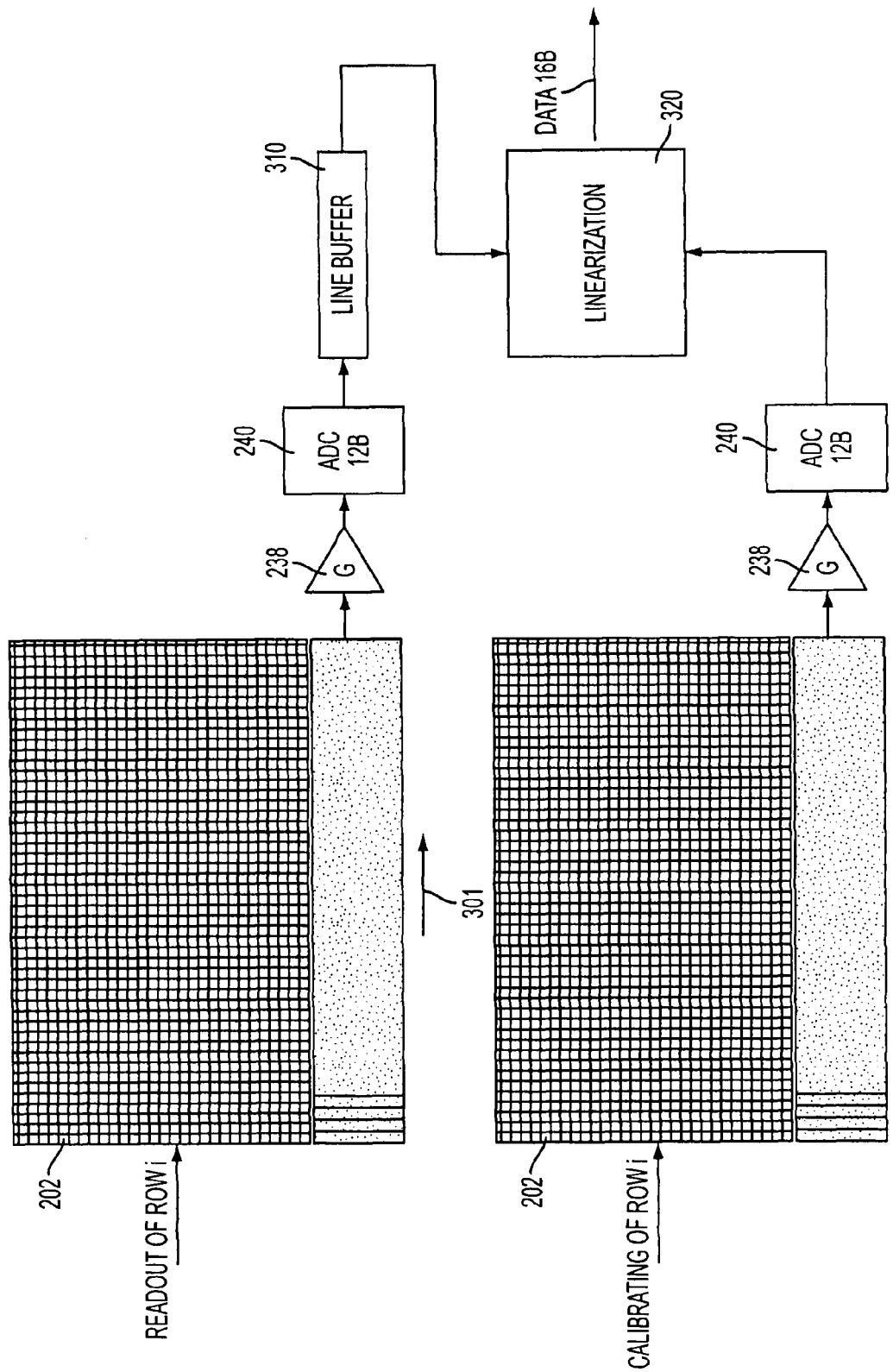
FIG. 8 illustrates a disclosed embodiment implemented with a rolling shutter mode of operation.

FIG. 8 illustrates a simplified block diagram of a disclosed embodiment of an imager using a rolling shutter. As shown in FIG. 8, each row of pixel array 202 needs to be read out twice, first in step 301 using the dual integration exposure and readout (Tint_1, Tint_2) high-dynamic range operation (FIG. 2B), and then again immediately afterward in step 302 using the calibration operation (FIG. 6). The readout signals Vrst, Vsig for each of the two readouts go to the differential amplifier 238, which subtracts Vrst and Vsig and applies a gain to the resulting pixel output signal, which is then digitized by the ADC 240. The imager using a rolling shutter requires a line buffer for each knee point in order to store the calibration values. The linearization (step 320) could be performed on chip if it is a system-on-a-chip (SOC). Otherwise the image pixel values and calibration values can be output to the user and manually input into an external image processor.

In another disclosed embodiment, more than two integration times (and correspondingly, more than one "fill-and-spill" operation) may be employed, resulting in a multiple knee point curve. The calibration procedure may be performed sequentially for each knee point (e.g., for each value of barrier) or for may be performed for one value of the knee point, with the other values being estimated based on the calibrated value.

Figure 9:
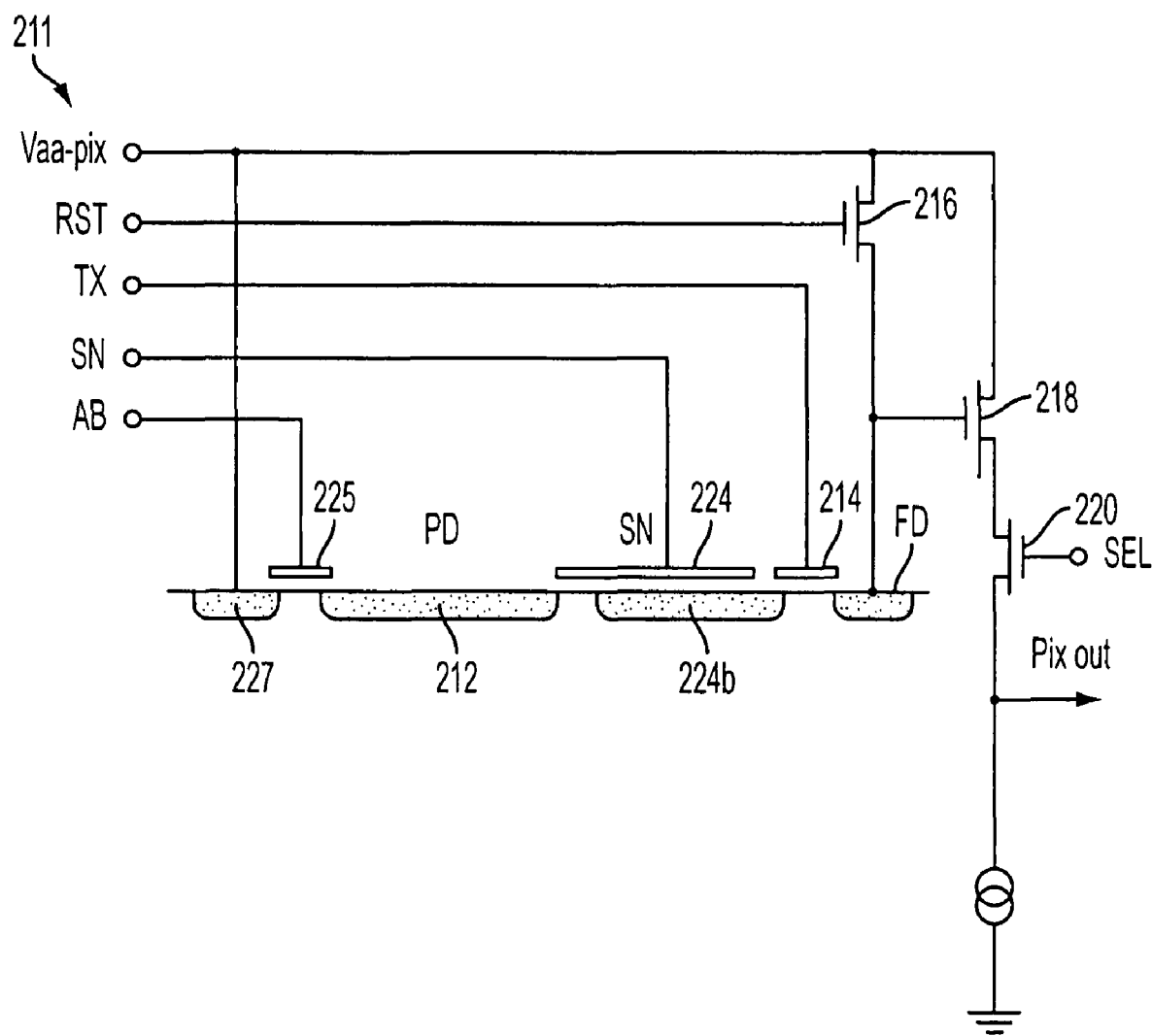
FIG. 9 illustrates a pixel constructed for global shutter operation in accordance with disclosed embodiments.

The embodiments previously described have been described with reference to a four transistor (4T) pixel. Disclosed embodiments may also be implemented using other pixel configurations, for example a six transistor (6T) pixel. Such a 6T pixel 211 is illustrated in FIG. 9. The pixel 211 contains a photosensor 212, transfer gate 214, a floating diffusion region FD to collect charge transferred from the photosensor 212, a reset transistor 216, row select transistor 220 and a source follower output transistor 218. The pixel 211 also includes a storage gate 224 for storing charge from the photosensor 212 in a channel region 224b when a storage gate control signal SN is applied to a storage gate control line, and an anti-blooming gate 225, which may be used to drain away excess charge from the photosensor 212 to another region 227 when an anti-blooming control signal AB is applied to the anti-blooming gate 225.

Pixel 211 uses a storage node 224 for an imager with a global shutter. For such an imager, the high dynamic range operation (i.e., the electron overflow and draining) is performed by the anti-blooming transistor 225 gate, instead of the transfer transistor 214 gate. The calibration and imaging otherwise occur in the same manner as previously described with reference to the 4T pixel. The barrier calibration of disclosed embodiments is performed globally for all pixels (simultaneously on the frame basis) either periodically during imager use or at the beginning of imager operation. The image frame pixel values with calibration values of the barrier level for each pixel may output to the user or be used by an SOC image processor, e.g., 150, FIG. 1, for performance of the linearization procedure.

FIG. 10A illustrates the photosensor potential of four different pixel output signals as a function of integration time during operation of a global shutter embodiment. Each of lines P, Q, R and S shows how charge in the photosensor 212 changes with the exposure, depending on light intensity. In FIG. 10A, line P corresponds to the highest light intensity and line S corresponds to the lowest light intensity. The equivalent integration times for the different light intensities (P, Q, R and S) are $T_P$, $T_Q$, $T_R$ and $T_S$, respectively. It can be seen in FIG. 10A that the charge in the pixel follows the barrier potential line if the growth rate of the potential is faster than that of the barrier potential itself but leaves this curve as soon as the barrier potential starts increasing faster. Global shutter high dynamic range operation allows the arbitrary shape of signal response to be achieved, as shown in FIG. 10B. This allows for the creation of a signal response curve with continuous change (such as a logarithmic response curve) of integrations times for pixels under different illuminations.

It should be noted that the timing of the calibration may vary depending on desired response. For example, the calibration could be performed once at the factory and the calibration values of the barrier level could be stored in frame memory on the imager. Alternatively, the calibration could be done once every set number of frames (e.g., every 1000 frames), or at imager start up, and the calibration values can be stored in frame memory on the imager. The calibration could also be completed every time an image is taken, as described in embodiments above, with the pixel array being read out twice (once for image capture and once for calibration), in which case the calibration values do not need to be stored on the imager.

While two examples of specific pixel architectures (4T and 6T transistors) have been described as implementing the disclosed embodiments, it should be noted that the embodiments are not limited to use with these disclosed pixel architectures. Other types of pixel architectures known in the art, such as, for example a 3T transistor, may also be used to implement the electron overflow and draining of disclosed embodiment with a reset transistor to implement an imager having high dynamic range operation capabilities.

Figure 11:
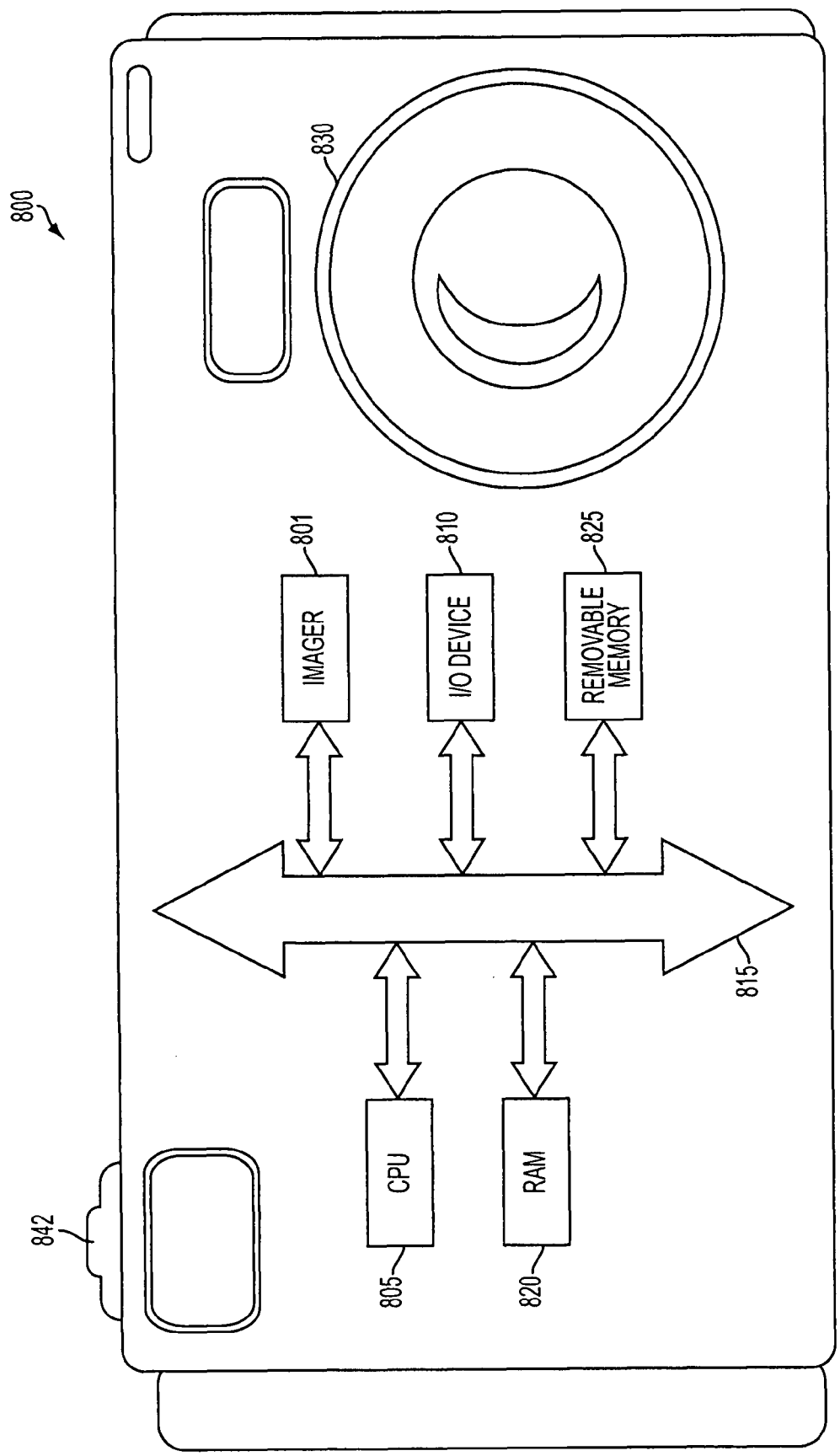
FIG. 11 illustrates a camera system, for example, a digital still or video camera, which may employ an imager constructed in accordance with disclosed embodiments.

Disclosed embodiments may be implemented as part of a camera such as e.g., a digital still or video camera, or other image acquisition system. FIG. 11 illustrates a processor system as part of, for example, a digital still or video camera system 800 employing an imager 801 that provides high-dynamic range imaging as described above. The processing system includes a processor 805 (shown as a CPU) which implements the system, e.g. camera 800, functions and also controls image flow through the system. The processor 805 is coupled with other elements of the system, including random access memory 820, removable memory 825 such as a flash or disc memory, one or more input/out devices 810 for entering data or displaying data and/or images and imager 801 through bus 815 which may be one or more busses or bridges linking the processor system components. The imager 801 receives light corresponding to a captured image through lens 840 when a shutter release button 842 is depressed.

While described embodiments have been described in detail, it should be readily understood that the embodiments are not limited to those disclosed. Rather the embodiments can be modified to incorporate any number of variations, alterations, substitutions or equivalent arrangements not heretofore described. Accordingly, the invention is not limited to the embodiments described herein but is only limited by the scope of the appended claims.

What is claimed as new and desired to be protected by Letters Patent of the United States is:

1. A method of operating an imager, comprising:
   during a first operating mode:
      accumulating charge with a photosensor of a pixel during a first integration period;
      pulsing a transistor of the pixel with a first voltage which is lower than a turn on voltage of the transistor at the end of the first integration period, the transistor being electrically coupled to the photosensor;
      continuing to accumulate charge with the photosensor during a second integration period which follows the pulsing; and
      reading out accumulated charge in the photosensor after the second integration period; and
   during a second operating mode:
      filling the photosensor with charge;
      pulsing the transistor with the first voltage to remove a portion of the charge and leaving residual charge in the photosensor; and
      reading out the residual charge.

2. The method of claim 1, wherein pulsing the transistor in the first operating mode removes a portion of the charge accumulated by the photosensor during the first integration period when the accumulated charge is greater than a barrier potential set by the first voltage and an integration time for these photosensors is equal to the second integration period.

3. The method of claim 1, wherein pulsing the transistor in the first operating mode does not remove a portion of the charge accumulated by the photosensor during the first integration period when the accumulated charge is less than a barrier potential set by the first voltage and an integration time for these photosensors is equal to the first integration period plus the second integration period.

4. The method of claim 1, wherein the transistor is selected from the group consisting of a transfer transistor and an anti-blooming transistor, and when the transistor is the transfer transistor, the pulsing of the transistor results in a transferring of charges from the photosensor to a storage region, and when the transistor is an anti-blooming transistor, the pulsing of the transistor results in a draining of charges from the photosensor during an integration period.

5. The method of claim 1, wherein the first operating mode occurs for each image captured by the imager and the second operating mode occurs once for each predetermined number of images captured.

6. The method of claim 1, wherein the read out accumulated charge corresponds to an image signal value and the method further comprises adjusting the image signal value in dependence on a pixel response knee point value for image signals produced by the pixel, the knee point value being determined based on the read out residual charge.

7. The method of claim 6, wherein the pixel response knee point value is determined in accordance with:

$$KNEEPOINT=CALIB*(Tint\_1+Tint\_2)/(Tint\_1),$$

wherein KNEEPOINT is the signal value at which the knee point occurs, CALM is a calibrated value corresponding to the knee point determined based on the read out residual charge, Tint_1 is the first integration period and Tint_2 is the second integration period.

8. The method of claim 1, wherein:
the first operating mode further comprises:
  after the first integration period and before the second integration period, accumulating charge with the photosensor of the pixel during a third integration period; and
  pulsing the transistor of the pixel with the first voltage at the end of the third integration period; and
the second operating mode further comprises:
  before reading out the residual charge, filling the photosensor with charge a second time; and
  pulsing the transistor again with the first voltage to remove a portion of the charge and leaving residual charge in the photosensor.

9. A method of operating an imager, the method comprising:
filling a pixel photosensor with stored charges;
removing a portion of the stored charges from the photosensor by lowering a potential barrier to a set level which maintains residual charges within the photosensor;
reading out a signal representing the residual charges in the photosensor after the portion of stored charges are removed; and
using the read out signal representing the residual charges to determine a pixel response knee point value for image signals produced by the pixel.

10. The method of claim 9, further comprising:
capturing an image portion with the pixel by accumulating charges during first and second integration periods, the potential barrier being lowered to the set level at the end of the first integration period to begin the second integration period;
reading out an image pixel signal based on charges accumulated in the photosensor at the end of the second integration period; and
adjusting a value of the image pixel signal in dependence on the knee point value.

11. The method of claim 10, wherein an image pixel signal below the knee point value is adjusted differently from an image pixel signal above the knee point value.

12. A method of operating an imager, the method comprising:
filling a pixel photosensor with stored charges;
removing a portion of the stored charges from the photosensor by lowering a potential barrier to a set level which maintains residual charges within the photosensor; and
reading out a signal representing the residual charges in the photosensor after the portion of stored charges are removed, wherein the pixel comprises a transistor having a gate for transferring charges from the photosensor and wherein the lowering of the potential barrier to the set level comprises applying a voltage to the gate of the transistor which is higher than a turn on threshold voltage of the transistor.

13. A method of operating an imager, comprising:
during a calibration mode:
  filling a photosensor of a pixel with stored charges;
  removing a portion of the stored charges from the photosensor by lowering a potential barrier to a set level which maintains residual charges within the photosensor;
  reading out a signal representing the residual charges in the photosensor after the portion of stored charges are removed;
  repeating the filling, removing and reading out steps for a plurality of light intensities; and
  using the read out signals to determine a pixel response curve for image signals produced by the pixel; and
during an image capture mode:
  accumulating charge with the photosensor;
  reading out an image signal based on the accumulated charge in the photosensor; and
  adjusting a value of the image signal in dependence on the pixel response curve, wherein the calibration mode occurs once for each predetermined number of images captured and the image capture mode occurs once for each image captured.

14. An imager, comprising:
a pixel array comprising a plurality of pixels for providing an output signal, each pixel comprising:
  a photosensor configured to accumulate charge;
  a transistor having a gate for transferring charge from the photosensor, the transistor being electrically coupled to the photosensor; and
  a control circuit, the control circuit configured to cause:
  during a first operating mode:
    the photosensor to accumulate charge during a first integration period;
    the transistor to be pulsed with a first voltage which is lower than a turn on voltage of the transistor, at the end of the first integration period;
    the photosensor to continue to accumulate charge during a second integration period which follows the pulsing; and
    the photosensor to output the accumulated charge after the second integration period; and
  during a second operating mode:
    the photosensor to be filled with charge;
    the transistor to be pulsed with the first voltage to remove a portion of the charge and leaving residual charge in the photosensor; and
    the residual charge to be output by the photosensor.

15. The imager of claim 14, wherein during pulsing of the transistor in the first operating mode:
when the accumulated charge is greater than a barrier potential set by the first voltage, then a portion of the charge accumulated by the photosensor during the first integration period is removed and an integration time for these photosensors is equal to the second integration period; and when the accumulated charge is less than a barrier potential set by the first voltage, then none of the charge accumulated by the photosensor during the first integration period is removed and an integration time for these photosensors is equal to the first integration period plus the second integration period.

16. The imager of claim 14, wherein the transistor is selected from the group consisting of a transfer transistor and an anti-blooming transistor, and when the transistor is a transfer transistor, the imager further comprises a storage region and the pulsing of the transistor results in a transfer of charges from the photosensor to the storage region, and when the transistor is an anti-blooming transistor, the pulsing of the transistor results in a draining of charges from the photosensor during an integration period.

17. The imager of claim 14, wherein the control circuit is further configured to cause the first operating mode to occur for each image captured by the imager and to cause the second operating mode to occur once for each predetermined number of images captured.

18. The imager of claim 14, further comprising an image processor, wherein the accumulated charge that is output from the photosensor corresponds to an image signal value and the image processor is configured to adjust, for each pixel, the image signal value in dependence on a pixel response knee point value for an image signal produced by the pixel, the knee point value being determined based on the output residual charge.

19. The imager of claim 18, wherein the pixel response knee point value is determined in accordance with:

$$KNEEPOINT=CALIB*(Tint\_1+Tint\_2)/(Tint\_1),$$

wherein KNEEPOINT is the signal value at which the knee point occurs, CALIB is a calibrated value corresponding to the knee point determined based on the output residual charge, Tint_1 is the first integration period and Tint_2 is the second integration period.

20. An imager comprising:
a pixel array comprising a plurality of pixels for providing an output signal, each pixel comprising:
a photosensor configured to accumulate charge;
a transistor having a gate for transferring charge from the photosensor, the transistor being electrically coupled to the photosensor; and
a control circuit, the control circuit configured to cause:
a pixel photosensor to be filled with charge;
a potential barrier to be lowered to a set level, thereby removing a portion of the charge from the photosensor while maintaining residual charges within the photosensor; and
a signal representing the residual charges in the photosensor after the portion of stored charges are removed to be output; and
an image processor, the image processor being configured to use the output signal representing the residual charges to determine a pixel response knee point value for image signals produced by the pixel.

21. The imager of claim 20, wherein the control circuit is further configured to cause:
the photosensor to accumulate charge during first and second integration periods, thereby capturing an image portion, the potential barrier being lowered to the set level at the end of the first integration period to begin the second integration period; and an image pixel signal based on charges accumulated in the photosensor at the end of the second integration period to be output; and
wherein the image processor is further configured to adjust a value of the image pixel signal in dependence on the knee point value.

22. The imager of claim 21, wherein the image processor is configured to adjust an image pixel signal below the knee point value differently from an image pixel signal above the knee point value.

23. An imager comprising:
a pixel array comprising a plurality of pixels for providing an output signal, each pixel comprising:
a photosensor configured to accumulate charge;
a transistor having a gate for transferring charge from the photosensor, the transistor being electrically coupled to the photosensor; and
a control circuit, the control circuit configured to cause:
a pixel photosensor to be filled with charge;
a potential barrier to be lowered to a set level, thereby removing a portion of the charge from the photosensor while maintaining residual charges within the photosensor; and
a signal representing the residual charges in the photosensor after the portion of stored charges are removed to be output, wherein the control circuit causes the potential barrier to be lowered to a set level by applying a voltage to the gate of the transistor which is lower than a turn on threshold voltage of the transistor.

24. A method of operating an imager, the method comprising:
filling a pixel photosensor with stored charges;
removing a portion of the stored charges from the photosensor by lowering a potential barrier to a set level which maintains residual charges within the photosensor; and
reading out a signal representing the residual charges in the photosensor after the portion of stored charges are removed, wherein the signal representing the residual charges in the photosensor is read shortly after the portion of stored charges are removed such that the signal representing the residual charges in the photosensor represents the potential barrier.

25. An imager comprising:
a pixel array comprising a plurality of pixels for providing an output signal, each pixel comprising:
a photosensor configured to accumulate charge;
a transistor having a gate for transferring charge from the photosensor, the transistor being electrically coupled to the photosensor; and
a control circuit, the control circuit configured to cause:
a pixel photosensor to be filled with charge;
a potential barrier to be lowered to a set level, thereby removing a portion of the charge from the photosensor while maintaining residual charges within the photosensor; and
a signal representing the residual charges in the photosensor after the portion of stored charges are removed to be output, wherein the control circuit causes the signal representing the residual charges in the photosensor to output shortly after the portion of stored charges are removed such that the signal representing the residual charges in the photosensor represents the potential barrier.

* * * * *